United States Patent [19]

Barnett

[11] 3,771,305
[45] Nov. 13, 1973

[54] FIBER GLASS GROOVE PACKING
[75] Inventor: Irvin Barnett, Martinsville, N.J.
[73] Assignee: Johns-Manville Corporation, Denver, Colo.
[22] Filed: June 15, 1972
[21] Appl. No.: 263,027

[52] U.S. Cl. ............................. 57/140 G, 57/140 C
[51] Int. Cl. ........................... D02g 3/18, D02g 3/40
[58] Field of Search ............. 57/139, 140 R, 140 C, 57/140 G; 117/126 GF, 126 GQ

[56] References Cited
UNITED STATES PATENTS

| | | | |
|---|---|---|---|
| 2,557,834 | 6/1951 | McMullen | 57/140 G UX |
| 3,042,544 | 7/1966 | Marzocchi et al. | 117/126 GQ X |
| 3,066,383 | 12/1962 | Marzocchi et al. | 57/140 G X |
| 3,534,652 | 10/1970 | Zumeta et al. | 117/126 GF UX |
| 3,538,700 | 11/1970 | Hofer | 57/140 G UX |

*Primary Examiner*—Donald E. Watkins
*Attorney*—John A. McKinney et al.

[57] ABSTRACT

A fiber glass rope packing comprises slivers of C-grade, K diameter staple glass fibers which are twined. The packing is at least 96% by weight staple glass fibers which fibers are impregnated with an anti-static and lubricating agent.

9 Claims, No Drawings

FIBER GLASS GROOVE PACKING

BACKGROUND OF THE INVENTION

The present invention relates to a glass fiber rope packing and in particular, to a glass fiber rope packing adapted for use under static conditions. Rope packings, which are generally either twisted rope or braided rope packings, are ideal general-purpose packings. They can be used for emergency packing and gasketing where other materials are not available. The packings can also be used as packings where the shape or condition of the equipment will not allow the use of less pliable, less adaptable materials. These packings are commonly used in grooves for door sealing, between boiler sections and expansion joints. They can also be used for wrapping steam and exhaust lines where space limitations preclude formed insulation as well as for many other uses.

Packings suited for the above uses must be soft and resilient. In the past, such packings have been made by either twisting, braiding or plaiting carded slivers of asbestos fiber or strips of light density asbestos paper. However because of the uncertain supply of uniform quality asbestos fiber, the relatively high cost of manufacturing such fiber into rope form and the need to use a special grade of asbestos fiber for packings utilized in acid service, the need has arisen to find a replacement for asbestos.

Accordingly it is the object of the present invention to provide a relatively inexpensive replacement for asbestos fiber which can be utilized for both acid and nonacid service for temperatures ranging up to about 900° F. It is a further object of the invention to provide a packing which is compressible and lofty (i.e., possesses bulky and springy or resilient qualities) so that the packing will form a good seal.

SUMMARY OF THE INVENTION

The glass fiber rope packing of the present invention comprises at least 96 percent by weight C-grade staple glass fibers. Due to the random length of the fibers and the high degree of fiber disarray in the slivers of the packing, the packing is compressible and lofty. The slivers of the staple glass fibers are twisted, braided or plaited together to form the fiber glass rope packing.

DETAILED DESCRIPTION OF THE INVENTION

The fiber glass rope packing of the present invention is made up of staple glass fibers and an anti-static and lubricating agent. In percentages by weight, the packing is 96 percent to 99.5 percent by weight staple glass fibers and 0.5 percent to 4 percent by weight anti-static and lubricating agent. In a preferred embodiment, the rope packing is, in approximate percentages by weight, 98 percent staple glass fibers and 2 percent anti-static and lubricating agent.

The rope packing has good acid resistance and a maximum soluble chloride content of 100 parts per million. Due to the randomly oriented non-compacted staple glass fibers of the packing, the packing possesses the desired compressibility and loftiness required of a material for packing purposes. In addition, the staple glass fibers are able to withstand temperatures of about 900° F thereby making the packings commercially acceptable for use in environments having temperatures ranging up to about 750° F with a safety factor of 150° F.

The staple glass fibers are random in length and, for the most part, range between 4 and 20 inches in length with some of the fibers being as short as 1 inch in length. The glass fibers are a chemical or C-grade glass and have a K diameter e.g., about 12 to 14 microns.

The anti-static and lubricating agent is preferably an alcohol phosphate such as that marketed by E.I. DuPont De Numeors under the trade mark "ZELECK". The anti-static and lubricating agent facilitates the manufacture of the rope packing by minimizing fiber breakage as well as improving the handling qualities of the rope packing.

The rope packing is made by utilizing slivers of staple glass fiber wherein the fibers are of random length and in a state of disarray. The antistatic and lubricating agent is applied to the sliver prior to twisting the sliver. One form of applying the anti-static and lubricating agent is to apply the agent by means of a rotating grooved wheel as each sliver is en route from the raw sliver cheeses to a winder where the sliver is wound into a spool for subsequent forming operations. The speed of the applicator is adjusted to effect the necessary impregnation of the sliver with the agent. For example, if it is desired to have the finished product contain about 2 percent by weight agent, the speed of the applicator is adjusted for about 30 percent wet pick-up from a 7 percent solids solution of the agent.

Each sliver is then drawn off the spool and passed through a conventional twister (e.g., a Haskill Dawes twister) where the slivers are individually twisted, in either an S or Z direction, at 15 to 20 turns per foot.

In order to make a rope form suitable for use as a packing or gasket, a plurality of the slivers are combined in a conventional forming machine where they are twisted, braided or plaited together in such a manner that the slivers retain their compressibility and loftiness. When forming a twisted rope packing, a plurality of slivers are combined in a conventional forming machine where the slivers are grouped together and a small amount of twist is applied to retain the slivers in a unit form. The slivers are twisted together in a direction opposite to the direction of twist of each individual sliver. Consequently, if the slivers have been twisted in the Z direction, the twist of the slivers collectively will be in the S direction. Since the slivers are not compacted during the forming operation, the finished product retains the compressibility and loftiness originally present in the slivers. After the rope packings have been formed the anti-static and lubricating agent is allowed to dry and the packings are ready for use.

The following tables are illustrative of typical rope packings of the present invention which range in diameter from 1/4 inch to 2 inches. The 1/4 inch diameter rope is made from slivers of staple glass fiber, such as that made by the Schuller process, which weigh about 600 ft/lbs and are initially formed into 1/8 inch twisted slivers.

| Size inch | Direction of twist | Number of ⅛ in. used Core | Perimeter | Total | Feet/lb Nominal ± 10% |
|---|---|---|---|---|---|
| ⅛ | Z | — | — | — | — |
| ¼ | S | 0 | 4 | 4 | 150 |

The 3/8 inch diameter ropes and larger are made from slivers of staple glass fiber, such as fibers made by the Schuller process, which weigh about 150 ft/lbs and are initially formed into 1/4 inch twisted slivers.

| Size inch | Direction of twist | Number of 1/4 in. Used Core | Perimeter | Total | Feet/lb Nominal ± 10% |
|---|---|---|---|---|---|
| ¼ | Z | — | — | — | — |
| ⅜ | S | 0 | 3 | 3 | 70 |
| ½ | S | 0 | 4 | 4 | 35 |
| ¾ | S | 1 | 8 | 9 | 16 |
| 1 | S | 4 | 10 | 14 | 9 |
| 2 | S | 34 | 22 | 56 | 2 |

What I claim is:

1. A glass fiber rope packing comprising: compressible and lofty slivers of C-grade staple glass fibers wherein said fibers are in a state of high disarry, said slivers being twined together, and said packing in approximate percentages by weight being at least 96 percent by weight staple glass fibers.

2. The fiber glass rope packing as defined in claim 1 wherein an approximate percentages by weight said packing is 0.5 percent to 4 percent by weight anti-static and lubricating agent.

3. The glass fiber rope packing as defined in claim 1 wherein said staple glass fibers are 12 to 14 microns in diameter.

4. The glass fiber rope packing as defined in claim 1 wherein said slivers are twisted together.

5. The glass fiber rope packing as defined in claim 1 wherein said slivers are braided together.

6. The glass fiber rope packing as defined in claim 1 wherein at least one of said slivers is a core and remaining slivers envelope said core.

7. The glass fiber rope packing as defined in claim 1 wherein said slivers each have a twist in one direction and said slivers are twined together with twist in an opposite direction.

8. The glass fiber glass rope packing as defined in claim 2 wherein said anti-static and lubricating agent is an alochol phosphate.

9. A glass fiber rope packing comprising: compressible and lofty slivers of random length, C-grade staple glass fibers wherein said fibers are in a state of high disarray and said fibers are 12 to 14 microns in diameter, said slivers being twined together, with said slivers each having a twist in one direction and said slivers being twined together in an opposite direction, and said packing in approximate percentages by weight being at least 98 percent by weight staple glass fibers with the remainder comprising anti-static and lubricating agent.

* * * * *